US009996209B2

(12) United States Patent
Grossman et al.

(10) Patent No.: US 9,996,209 B2
(45) Date of Patent: Jun. 12, 2018

(54) TECHNIQUES FOR REPRESENTING AND COMPARING WORKFLOWS

(71) Applicant: AUTODESK, INC., San Rafael, CA (US)

(72) Inventors: Tovi Grossman, Toronto (CA); Maneesh Agrawala, Oakland, CA (US); Nicholas Chi-yuen Kong, Berkeley, CA (US); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 263 days.

(21) Appl. No.: 13/875,616

(22) Filed: May 2, 2013

(65) Prior Publication Data

US 2013/0311927 A1 Nov. 21, 2013

Related U.S. Application Data

(60) Provisional application No. 61/641,472, filed on May 2, 2012.

(51) Int. Cl.

*G06F 3/048* (2013.01)
*G06Q 10/06* (2012.01)
*G06Q 10/10* (2012.01)
*G06T 11/60* (2006.01)

(52) U.S. Cl.

CPC ............. *G06F 3/048* (2013.01); *G06Q 10/06* (2013.01); *G06Q 10/06316* (2013.01); *G06Q 10/10* (2013.01); *G06T 11/60* (2013.01)

(58) Field of Classification Search

None

See application file for complete search history.

(56) References Cited

U.S. PATENT DOCUMENTS

| | | | | |
|---|---|---|---|---|
| 5,999,911 | A * | 12/1999 | Berg | G06F 17/50 705/7.13 |
| 7,024,429 | B2 * | 4/2006 | Ngo et al. | |
| 7,747,958 | B2 * | 6/2010 | Luo et al. | 715/762 |
| 8,442,852 | B2 * | 5/2013 | Sun et al. | 705/7.27 |
| 8,645,854 | B2 * | 2/2014 | Kopycinski et al. | 715/772 |
| 8,782,548 | B2 * | 7/2014 | Mackay et al. | 715/772 |
| 2012/0005520 | A1 * | 1/2012 | Ashraff et al. | 714/4.11 |
| 2012/0209649 | A1 * | 8/2012 | Ovenden et al. | 705/7.15 |
| 2013/0104132 | A1 * | 4/2013 | Chen | G06F 17/3089 718/102 |

* cited by examiner

*Primary Examiner* — Anil N Kumar
(74) *Attorney, Agent, or Firm* — Artegis Law Group, LLP

(57) ABSTRACT

An approach is provided for sending pre-defined workflows to a display device of a user device. In one example, the approach includes receiving a request for steps to complete a task associated with a software application. In response to receiving the request for steps, the system obtains at least a first workflow and a second workflow, each workflow including one or more steps that the user device can execute to complete the task. The system receives a request to format the first workflow and the second workflow into one or more view formats. The system generates a summary of the first workflow and a summary of the second workflow. Each summary includes one or more salient attributes of the each workflow. The system sends to the display device at least the first workflow and the second workflow in the one or more view formats.

23 Claims, 12 Drawing Sheets

TECHNIQUES FOR REPRESENTING AND COMPARING WORKFLOWS

CROSS-REFERENCE TO RELATED APPLICATION

This application claims priority benefit of U.S. provisional patent application Ser. No. 61/641,472, filed May 2, 2012, which is hereby incorporated herein by reference.

BACKGROUND OF THE INVENTION

Field of the Invention

The invention relates generally to computer software and, more specifically, to techniques for representing and comparing workflows.

Description of the Related Art

A workflow is a series of steps that a user can instruct a user device to carry out in order to complete a particular task on a software application. Each step may include one or more commands that the user device executes, sequentially or in parallel, to complete the particular task. Different workflows may lead to a substantially same end result. For a complex software application, a workflow for a task may require a user to initiate execution of a multitude of steps or commands on a user device. For example, design software, such as image editors, animation tools, and 3D modeling applications, provide a user with powerful ways to generate and modify virtual content. The user interfaces for such applications are complex and can be difficult to learn.

While software documentation can provide assistance with locating and using individual components, a user often refers to tutorials on the Internet to learn the required workflows for completing higher-level tasks. For example, a user of Photoshop™ wishing to correct red-eye in a photograph could search the Internet to find at least one workflow that includes step-by-step instructions (e.g., commands) for completing the task correcting red-eye.

Unfortunately, searching the Internet for particular workflows is time-consuming and non-intuitive for users. A user needs to differentiate between workflows in order to choose a more suitable workflow for the task. A challenge for a user is no longer searching for and finding a workflow. Rather, a challenge is identifying the most suitable workflow from potentially hundreds of candidates.

As the foregoing illustrates, what is needed is a technique that enables a user to select a more suitable workflow in a manner that is more efficient and intuitive relative to prior art approaches.

SUMMARY OF THE INVENTION

One example embodiment of the present invention sets forth a method for sending pre-defined workflows to a display device of a user device. The method includes receiving a request for steps to complete a task associated with a software application; in response to receiving the request for steps, obtaining at least a first workflow and a second workflow, where each workflow includes one or more steps the user device can execute to complete the task; and generating a summary of the first workflow and a summary of the second workflow, where the summary of the first workflow includes one or more attributes of the first workflow, and where the summary of the second workflow includes one or more attributes of the second workflow; and sending to the display device at least the first workflow and the second workflow in one or more view formats.

Another example embodiment of the present invention sets forth a computer readable storage medium storing instructions that, when executed by a processor, cause the processor executing a program to provide pre-defined workflows to a display device of a user device by receiving a request for steps to complete a task associated with a software application; in response to receiving the request for steps, obtaining at least a first workflow and a second workflow, where each workflow includes one or more steps the user device can execute to complete the task; and generating a summary of the first workflow and a summary of the second workflow, where the summary of the first workflow includes one or more attributes of the first workflow, and where the summary of the second workflow includes one or more attributes of the second workflow; and sending to the display device at least the first workflow and the second workflow in one or more view formats.

Yet another example embodiment of the present invention sets forth a workflow device for sending pre-defined workflows to a display device of a user device. The workflow device includes a workflow engine that is configured to receive a request for steps to complete a task associated with a software application; in response to receiving the request for steps, obtain at least a first workflow and a second workflow, where each workflow includes one or more steps the user device can execute to complete the task; generate a summary of the first workflow and a summary of the second workflow, where the summary of the first workflow includes one or more salient attributes of the first workflow, and where the summary of the second workflow includes one or more salient attributes of the second workflow; and send to the display device at least the first workflow and the second workflow in one or more view formats.

Advantageously, the disclosed approaches enable a user to read a summary of each workflow and, based on the summaries, perform a comparison among workflows that is quicker and more intuitive than a comparison that requires the user to read source documents, such as help guides, instruction manuals, online tutorials, Internet forums, Internet chat rooms, etc.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
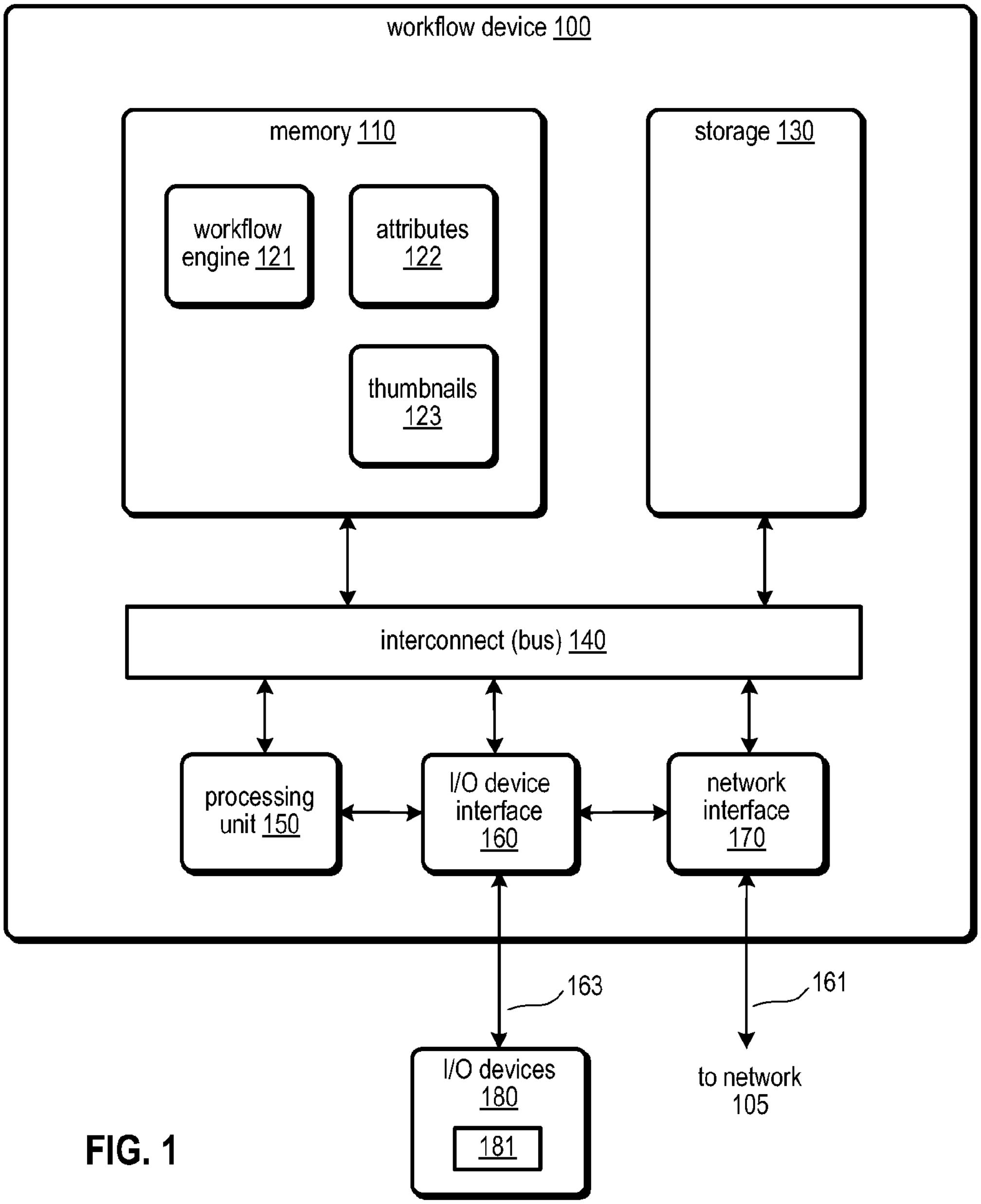
FIG. 1 illustrates a workflow device including a workflow engine configured to implement one or more aspects of the present invention.

FIG. 1 illustrates a workflow device 100 including a workflow engine 121 configured to implement one or more aspects of the present invention. Workflow device 100 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Workflow device 100 is configured to run a workflow engine 121 that resides in a memory 110. Workflow engine 121 and memory 110 are described in detail below with respect to FIGS. 2-11. In addition, workflow device 100 is configured to receive input from an end-user and from a video streaming source, such as a network connection to the Internet or any other data network. Workflow device 100 is further configured to display graphical images and/or video to the end-user via input/output (I/O) devices 180 (described below). It is noted that the computing device described herein is illustrative and that any other technically feasible configurations fall within the scope of the present invention.

As shown, workflow device 100 includes an interconnect (bus) 140 that connects a processing unit 150, an input/output (I/O) device interface 160 coupled to input/output (I/O) devices 180, memory 110, a storage 130, and a network interface 170. Processing unit 150 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 150 may be any technically feasible hardware unit capable of processing data and/or executing software applications, including workflow engine 121. Further, in the context of this disclosure, the computing elements shown in workflow device 100 may correspond to a physical computing system (e.g., a system in a data center) or may be a virtual computing instance executing within a computing cloud.

I/O devices 180 may include devices capable of receiving input, such as a keyboard, a mouse, a video camera, a three-dimensional (3D) scanner, and so forth, as well as devices capable of providing output, such as a display device 181, a speaker, and so forth. Display device 181 may be a computer monitor, a video display screen, a display apparatus incorporated into a hand held device, or any other technically feasible display screen configured to present video media to an end-user. In some embodiments, display device 181 is a terminal window displayed on another display device, such as a video display window that has been opened by workflow engine 121. Additionally, I/O devices 180 may include devices capable of both receiving input and providing output, such as a touch screen, a universal serial bus (USB) port, and so forth. I/O devices 180 may be configured to receive various types of input from an end-user of workflow device 100, and to also provide various types of output to the end-user of workflow device 100. In some embodiments, one or more of I/O devices 180 are configured to couple workflow device 100 to a network 105.

Network 105 may be any technically feasible type of communications network that allows data to be exchanged between workflow device 100 and external entities or devices, such as a video archive database or a provider of on-demand streaming media. For example, network 105 may include a wide area network (WAN), a local area network (LAN), a wireless (WiFi) network, and/or the Internet, among others.

Memory 110 may include a random access memory (RAM) module, a flash memory unit, or any other type of memory unit or combination thereof. Processing unit 150, I/O device interface 160, and network interface 170 are configured to read data from and write data to memory 110. Memory 110 includes various software programs that can be executed by processor 150 and application data associated with the software programs, including workflow engine 121, attributes 122 of workflows being displayed by workflow engine 121, and a plurality of thumbnails 123 associated with the workflows being displayed by workflow engine 121, as described in greater detail below. In other embodiments, attributes 122 and thumbnails reside on a server, and results of a workflow search, described below, are pushed to workflow device 100, instead of being generated locally.

Storage 130 may be any technically feasible persistent storage device, such as a disk drive storage device, a solid-state storage device, or a combination of both. Although shown as a single unit, storage 130 may be a combination of fixed and/or removable storage devices, such as fixed disc drives, removable memory cards, or optical storage, network attached storage (NAS), or a storage area-network (SAN).

Workflow engine 121 may be any computer application or workflow engine configured to generate formatted workflows for an end-user on display device 181, and comprises program instructions that can be executed by processor 150. For example, workflow engine 121 may be a proprietary application provided to an end-user by a provider of on-demand streaming media and installed on workflow device 100. Alternatively, workflow engine 121 may be a non-proprietary third-party application installed on workflow device 100. The workflows formatted by workflow engine 121 may be received via network 105 or may be locally stored workflow content, e.g., fully buffered in memory 110, stored on nonvolatile media in storage 130, and/or read from a disk or other video storage medium.

In some embodiments, workflow engine 121 receives data from an end-user of workflow device 100 via a keyboard, mouse, touch pad, and/or other suitable input devices, including a smart phone or digital tablet configured to communicate with workflow device 100. Thus, a mouse, touch pad, or other input device can be used by an end-user as a device to communicate with the workflow engine 121.

FIGS. 2A-2D are diagrams of example environments that include the workflow engine 121 of FIG. 1, according to embodiments of the present invention.

Figure 2A:
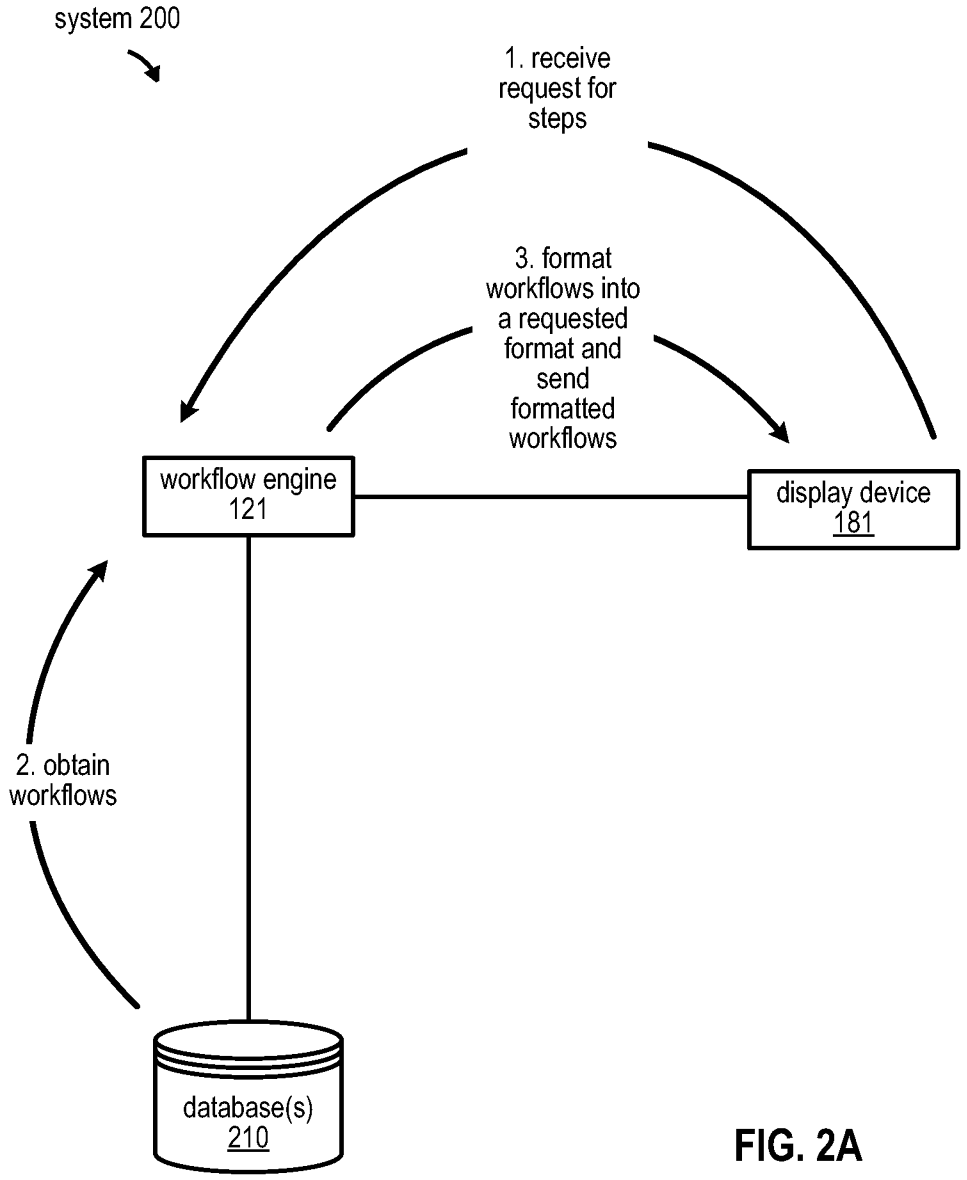
FIGS. 2A-2D are diagrams of example environments that include the workflow engine of FIG. 1, according to embodiments of the present invention.

As shown in FIG. 2A, a system 200 includes without limitation the workflow engine 121 communicatively connected to a display device 181 and one or more databases 210. The workflow engine 121 is configured to manage a corpus of workflows. The workflow engine 121 can receive a request, from a display device 181 of a user device (not shown in FIG. 2A), for steps to complete a task associated with a software application. In response to the request, the workflow engine 121 can obtain workflows for the task from one or more databases 210. As further described below with reference to FIGS. 3-7C, each workflow includes steps a user can initiate on the display device 181 to cause the user device to complete the task. For example, each workflow includes steps for carrying out a task associated with a software application (e.g., Photoshop™), which is application 150 of FIG. 1 in one implementation. The workflow engine 121 can format each workflow into one or more view formats, which are further discussed below with reference to FIGS. 3-7C. The workflow engine 121 can then send the formatted workflows to the user device for display on the display device 181.

Figure 2B:
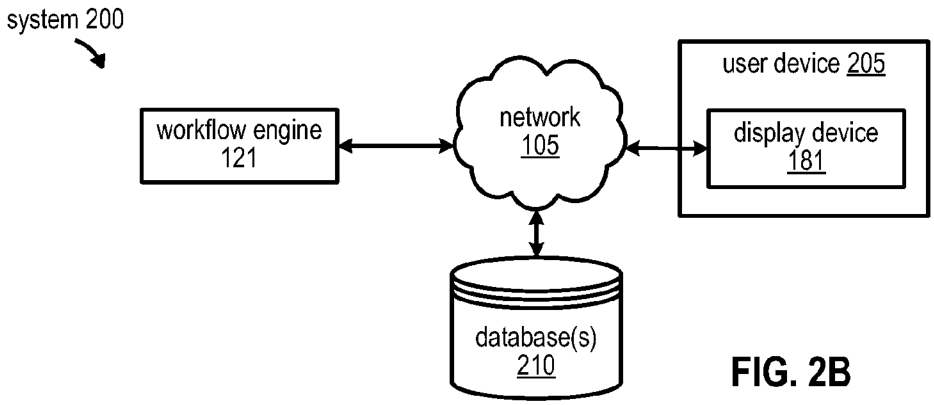

As shown in FIG. 2B, in one implementation, a system 200 includes without limitation the network 105 (e.g., the Internet) connecting the display device 181 with the workflow engine 121 and one or more databases 210. In this example, the display device 181 is included in a user device 205. The workflow engine 121 is configured to carry out, or instruct the workflow device 100 of FIG. 1 to carry out, one or more operations of the system 200. Such operations are described above with reference to FIG. 2A and further with reference to FIGS. 3-11. Examples of the user device 205 include without limitation a desktop computer, a laptop computer, a tablet computer, and/or a mobile phone, among other devices. The databases 210 may be located on different computer systems that are connected to the network 105. A person skilled in the art will understand that the example of FIG. 2B is one of many possible implementations for the system 200.

Figure 2C:
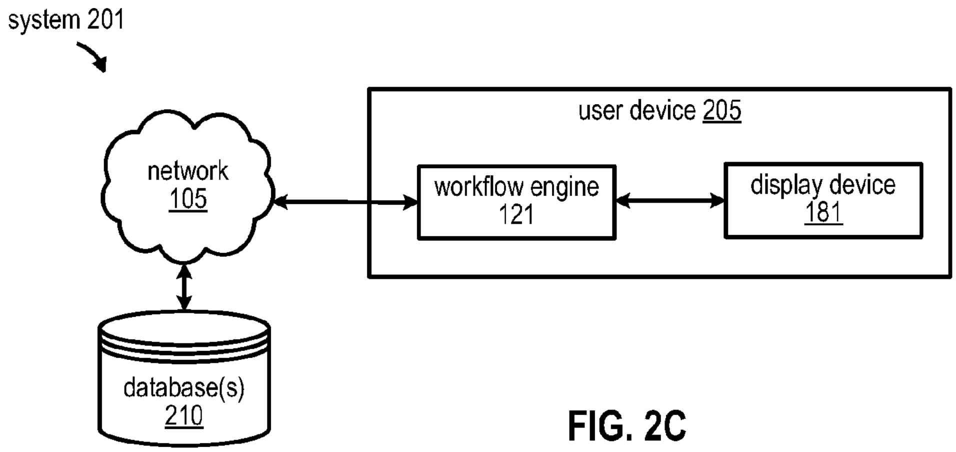

As shown in FIG. 2C, in another implementation, a system 201 includes without limitation the workflow engine 121 located on the user device 205 and communicatively connected to the display device 181. In this example, the network 105 communicatively connects the workflow engine 121 to the one or more databases 210.

Figure 2D:
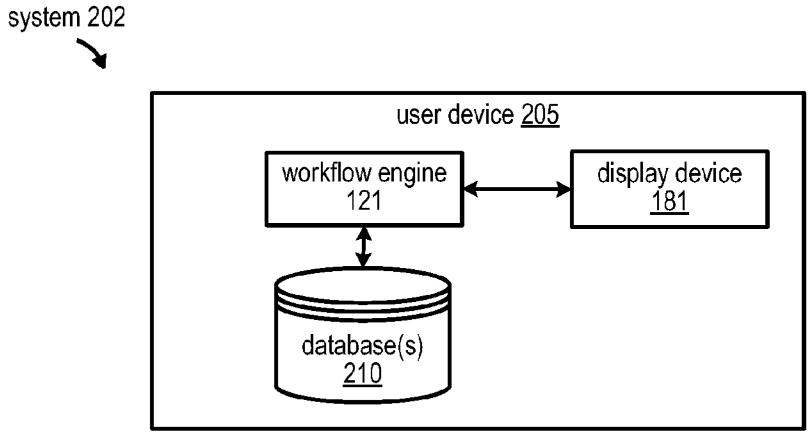

As shown FIG. 2D, in yet another implementation, a system 202 includes without limitation the workflow engine 121 and the database 210 located on the user device 205, which is disconnected from the network 105. In this example, the workflow engine 121 is communicatively connected to the display device 181 and the one or more databases 210 on the user device 100.

Within at least one of the environments shown in FIGS. 2A-2D, the system 200 can present workflows to a user in such a way that enables the user to understand the scope of the corpus of workflows, to explore each of the workflows in detail, and to compare similarities and differences in the structure (e.g., step sequence) of individual workflows. The system 200 enables the user to visualize and compare workflows by presenting the workflows in, for example, three levels of granularity: a high-level cluster view; an intermediate-level list view that contains workflow summaries; and a low-level detail view that enables the user to compare two individual workflows. To ease comparisons, in one embodiment, the system 200 can display workflows with a uniform presentation format within each granularity level. FIGS. 3-7C below describe the different views in more detail.

Presenting Workflows to a User

Figure 3:
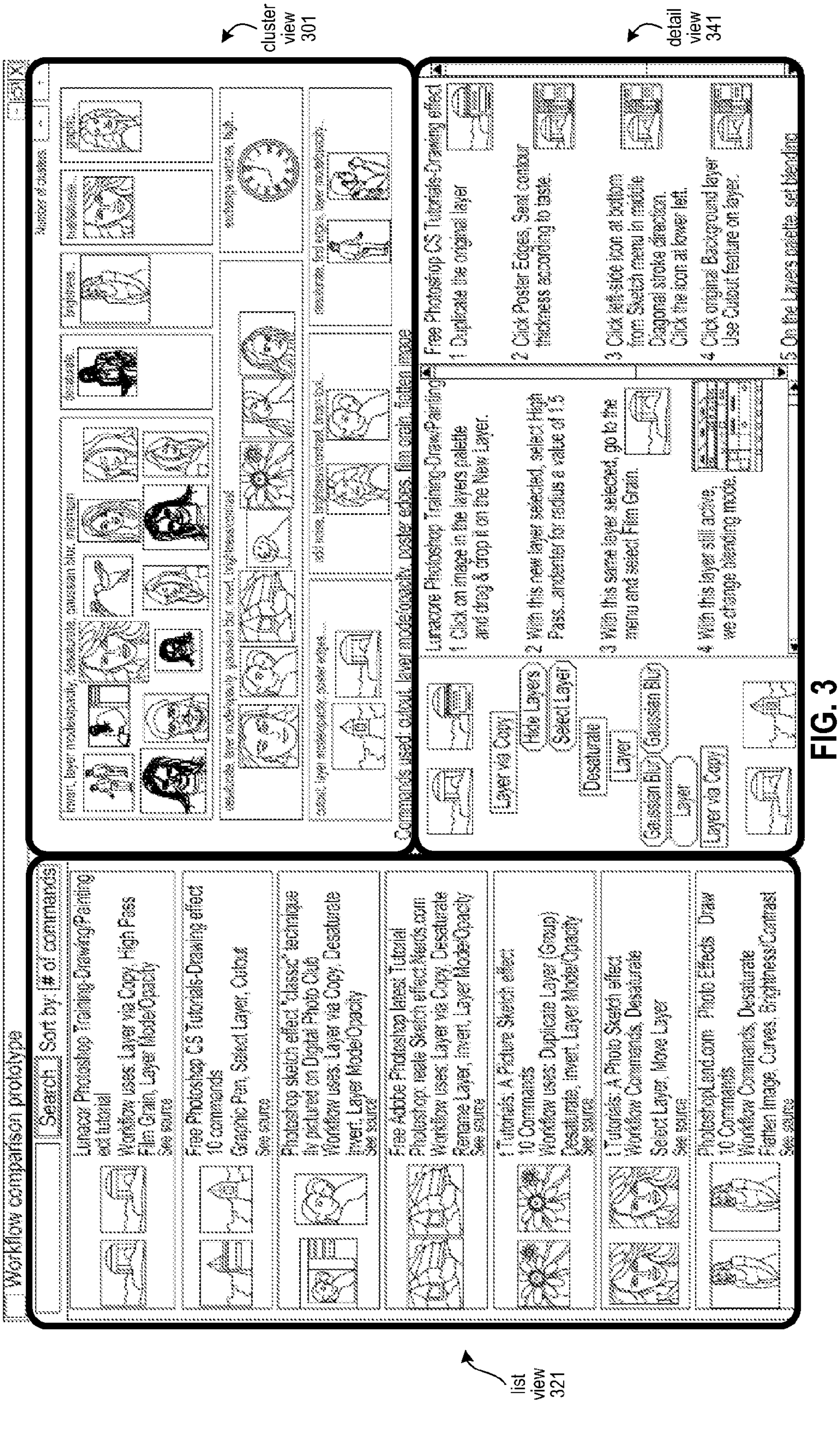
FIG. 3 is a diagram of an example user interface that displays workflows in three example granularity levels, according to one embodiment of the present invention.

FIG. 3 is a diagram of an example user interface that displays workflows in the three example granularity levels, according to one embodiment of the present invention. For explanatory purposes, the three granularity levels include a cluster view 301, a list view 321, and a detail view 341. A person skilled in the art will understand that another embodiment of the workflow engine 121 can present workflows in more than three granularity levels or less than three granularity levels. The description below provides more details of the three example granularity levels of workflow views.

Cluster View Format

Figure 4:
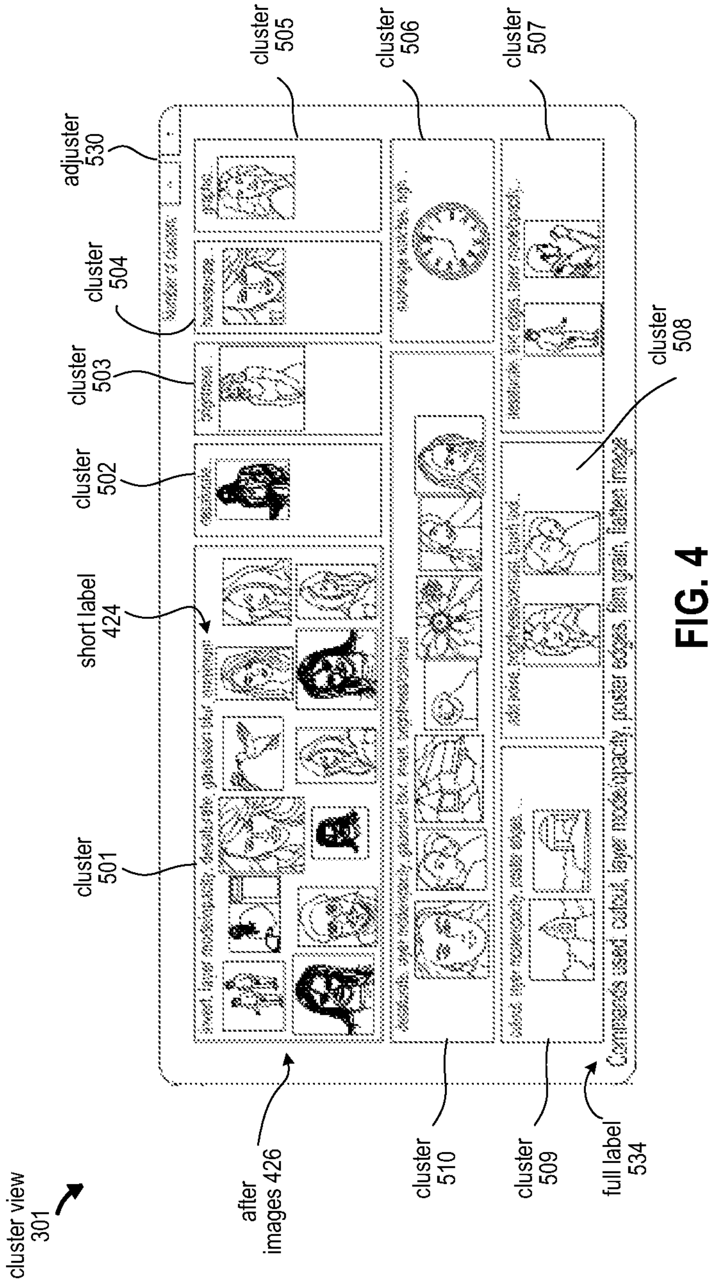
FIG. 4 is a more detailed diagram of the cluster view of FIG. 3, according to one embodiment of the present invention.

FIG. 4 is a more detailed diagram of the cluster view 301 of FIG. 3, according to one embodiment of the present invention. As shown in FIG. 4, the cluster view 301 provides a high-level summary of the corpus of workflows by grouping workflows according to a similarity metric. For example, the workflow engine 121 may group together workflows that accomplish the particular task in a substantially same number of steps; the workflow engine 121 may group together workflows that have a substantial number of steps in common; and/or the workflow engine 121 may group together workflows developed by the same author, and so on. Clusters enable users to rapidly distinguish between similar and different workflows.

The cluster view 301 includes several clusters of workflows. Example clusters include cluster 501, cluster 502, cluster 503, cluster 504, cluster 505, cluster 506, cluster 507, cluster 508 cluster 509, cluster 510, and cluster 511. The cluster 501 displays "after" images 426; the other clusters can include other after images.

In this particular cluster view 301, each cluster includes a group of workflows that share a command similarity metric (or step similarity metric). The workflow engine 121 can compute, or instruct the workflow device 100 to compute, a command similarity metric without requiring additional metadata, such as ratings of workflows (e.g., ratings from a sample set of users who tested and rated workflows). The command similarity metric is closely related to the knowledge of commands workflow attribute. The workflow engine 121 can computer, or instruct the workflow device 100 to compute, the command similarity metric by modeling each workflow as a sequence of steps, then computing the "edit distance" between sequences of steps. The edit distance is a sum of the costs of the insertions, deletions, and/or substitutions that are required to transform one step sequence into another step sequence. As one example, the workflow engine 121 can use the distance between commands in the Photoshop™ menu hierarchy to set the substitution cost. For instance, substituting the Gaussian Blur command for the Motion Blur command incurs a "low" substitution cost (e.g., 1 out of 10 substitution cost), because both commands are siblings in the Blur menu of Photoshop™.

The workflow engine 121 can then use, for example, hierarchical agglomerative clustering to generate the clusters in the cluster view 301. Hierarchical clustering is a commonly available technique of cluster analysis that seeks to build a hierarchy of clusters. Hierarchical agglomerative clustering is a bottom-up approach in which the workflow engine 121 starts each observation (e.g., observation of command similarity among workflows) in an individual cluster; the workflow engine 121 merges pairs of clusters as the workflow engine 121 moves up the hierarchy. Alternatively, the workflow engine 121 can use other methods, such as k-means, another common technique of cluster analysis. Then, the workflow engine 121 can lay out on the display the clusters by using a quantum treemap algorithm, a common layout algorithm. The quantum treemap algorithm is designed to layout items on a user interface compactly inside a minimized display dimension that includes the workflow images.

In one embodiment, the workflow engine 121 labels each cluster with the most common tools (e.g., five most common commands or steps) in the cluster's workflows. The workflow engine 121 can abbreviate a label for a cluster if the dimensions of the cluster on the display are too small to accommodate the full label. For example, the cluster 502 shows a short label that is an abbreviation of a full label. The workflow engine 121 can display a full label 534 in the cluster view when the system receives request for more information about a particular cluster, for example, when the system detects a mouse cursor positioned over the particular cluster. The workflow engine 121 can receive a click on an image in the cluster view and, in response to receiving the click, the list view (further described below) to scroll to the corresponding workflow. The workflow engine 121 can adjust the number of clusters by receiving input at, for example, an adjuster 530 including plus (+) and minus (−) icons. In response to receiving input at the adjuster 530, the workflow engine 121 can display, or instruct the workflow device 100 to display, a coarser corpus of workflows (e.g., more clusters and less detail per cluster) or a finer corpus of workflows (e.g., less clusters and more detail per cluster).

List View Format

Figure 5:
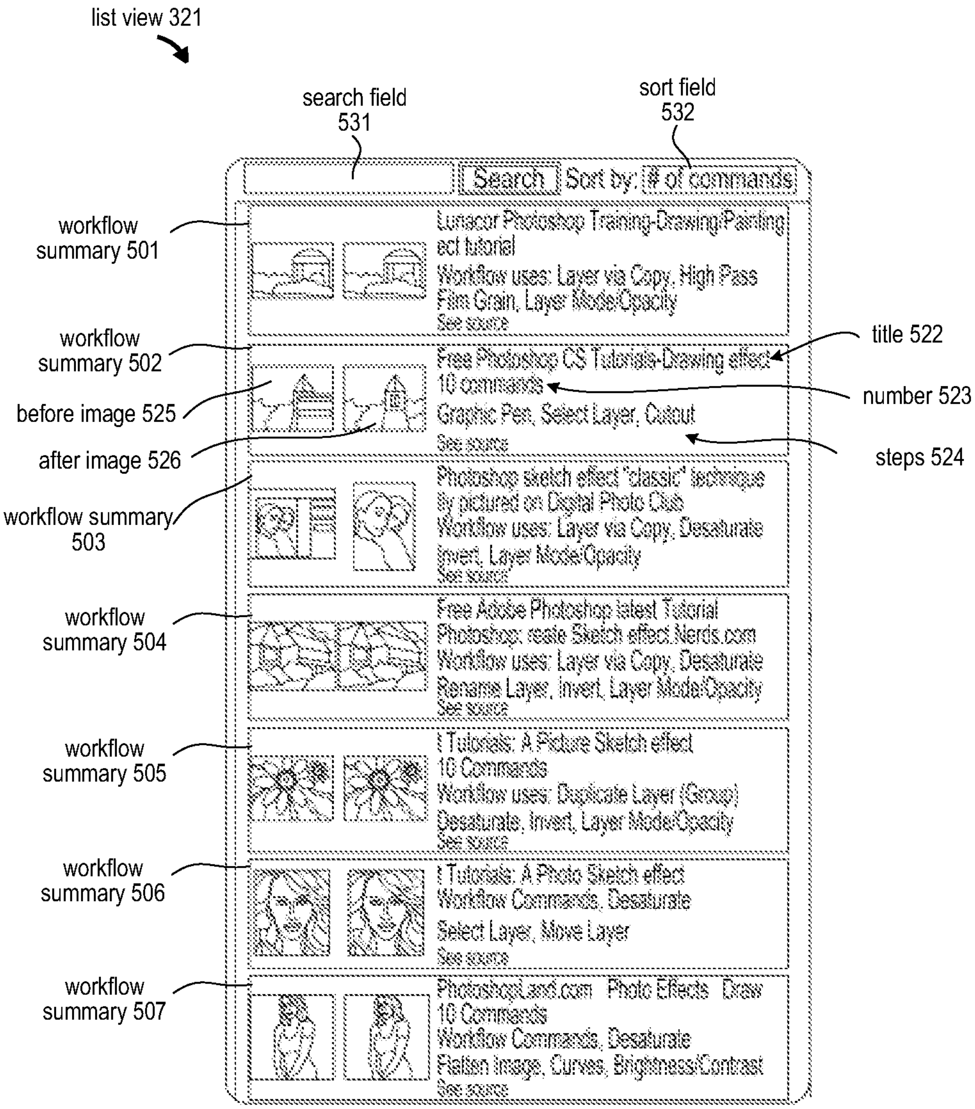
FIG. 5 is a more detailed diagram of the list view of FIG. 3, according to one embodiment of the present invention.

FIG. 5 is a more detailed diagram of the list view 321 of FIG. 3, according to one embodiment of the present invention. As shown in FIG. 5, the list view 321 includes example workflow summaries, including workflow summary 501, workflow summary 502, workflow summary 503, workflow summary 504, workflow summary 505, workflow summary 506, and workflow summary 507. In this example, the workflow engine 121 can receive a search query from a user at a search field 531. In response to receiving the query, the workflow engine 121 can obtain a set of appropriate workflows by searching, for example, one or more database 210 of FIGS. 2B-2D. As shown in FIG. 5, the workflow engine 121 can display the workflow summaries in a format of the list view 321.

The workflow engine 121 can sort the workflow summaries according to an attribute selection (e.g., number of steps, number of commands, cluster, and/or alphabetical order of title, etc.) received at a sort field 532. Sorting by cluster causes the workflow engine 121 to display workflows of a same cluster (e.g., sibling workflows) adjacent to one another. Clusters are described above with reference to FIG. 4.

In another embodiment, the workflow flow engine 121 can use similarity metrics (also discussed above with reference to FIG. 4) to sort the workflows in the list 321. The workflow engine 121 can calculate similarity metrics according to the existing knowledge or usage patterns of the end user. For example, the workflow engine 121 can gather information about steps or commands the end user performs or instructs the user device to perform. Based on the gathered information, the workflow engine 121 can calculate a similarity metric for each workflow relative to the usage pattern of the end user. Then, based on the familiarity level (e.g., similarity metric) of the steps or commands within each workflow, the workflow engine 121 can sort the workflows accordingly in the list view 321.

As shown in FIG. 5, each workflow summary can show result quality by displaying some of the more salient attributes of each workflow. A salient attribute is an attribute that users consider to be more important when comparing and assessing workflows. The more salient attributes may be pre-identified according to a controlled study on a group of users. One such study may involve, for example, obtaining information by performing steps, including (1) showing a group of users a set of workflows that include steps for accomplishing the same task and then (2) receiving a selection from each user of the workflow that each user would most likely use to complete the task. The workflow engine 121 analyze, or instruct the workflow device 100 to analyze, the results of the study (e.g., selections of the users) to calculate a list of the more salient attributes for each workflow. Referring again to FIG. 1, the workflow engine 121 can store attributes 152 in memory 110. Alternative, an administrator of the workflow engine 121 can manually select attributes that the administrator considers to be more salient for display in the list view 321. Advantageously, the list view 321 enables a user to read a summary of each workflow in the list view 321 and, based on the summaries, enables the user to perform a comparison among workflows that is quicker than a comparison based on reading source documents (e.g., help guides, instruction manuals, online tutorials, Internet forums, Internet chat rooms, etc.).

As an example of salient attributes, the workflow summary 502 includes a "before" thumbnail image 525 (e.g., image representing state of operations before performing the task), an "after" thumbnail image 526 (e.g., image representing state of operations after performing the task), a title 522, a number 523 of steps, and a list of steps 524. The list of steps 524 enables a user to judge step familiarity (or command familiarity) and to compare steps among workflow summaries. The total number 523 of steps 524 is a coarse indicator of efficiency of the workflow (e.g., how long it will take the user to instruct the computer to complete the task). The workflow engine 121 can receive a click on a thumbnail to view a full-resolution version of the image linked to the thumbnail. Each workflow summary can also include a link (e.g., "See source" link) to the source webpage from the particular workflow originates.

Detail View Format

Figure 6:
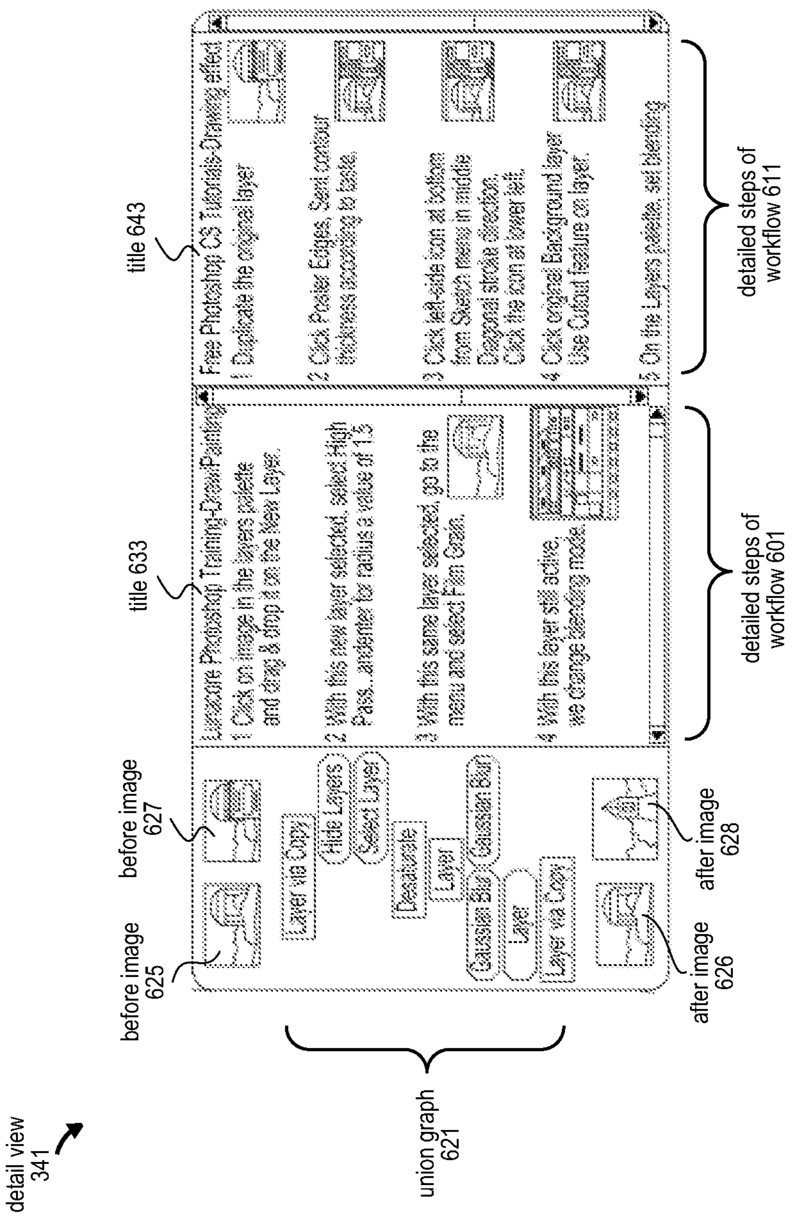
FIG. 6 is a more detailed diagram of the detail view of FIG. 3, according to one embodiment of the present invention.

FIG. 6 is a more detailed diagram of the detail view 341 of FIG. 3, according to one embodiment of the present invention. As shown in FIG. 6, the detail view 341 includes detailed steps of workflow 601, detailed steps of workflow 611, a title 633 for workflow 601, a title 643 for workflow 611, a union graph 621, a "before" image 625 for workflow 601, an "after" image 626 for workflow 601, a "before" image 627 for workflow 611, and an "after" image for workflow 611.

Accordingly, in this embodiment, the detail view 341 shows individual detailed steps of each workflow (e.g., workflow 601 and workflow 611). Each detailed step includes a step (or one or more commands) the user device can execute to move toward completion of the task. The union graph 621 shows a pair-wise comparison of the steps workflow 601 and the steps of workflow 611. When the workflow engine 121 receives a selection of a single workflow in the list view 321 of FIG. 3, the workflow engine 121 can respond by sending to the display device steps (or commands), in the detail view 341, of the selected workflow and accompanying screenshots of the original tutorial. Alternatively, the workflow engine 121 can send to the display steps in "text only" upon receiving an option selection of "text only" from the user interface. When the workflow engine 121 receives a selection of two workflows, the workflow engine 121 sends to the display device the workflows side-by-side and generates a union graph 621 of the two step-sequences.

Figures 7A, 7B, 7C:
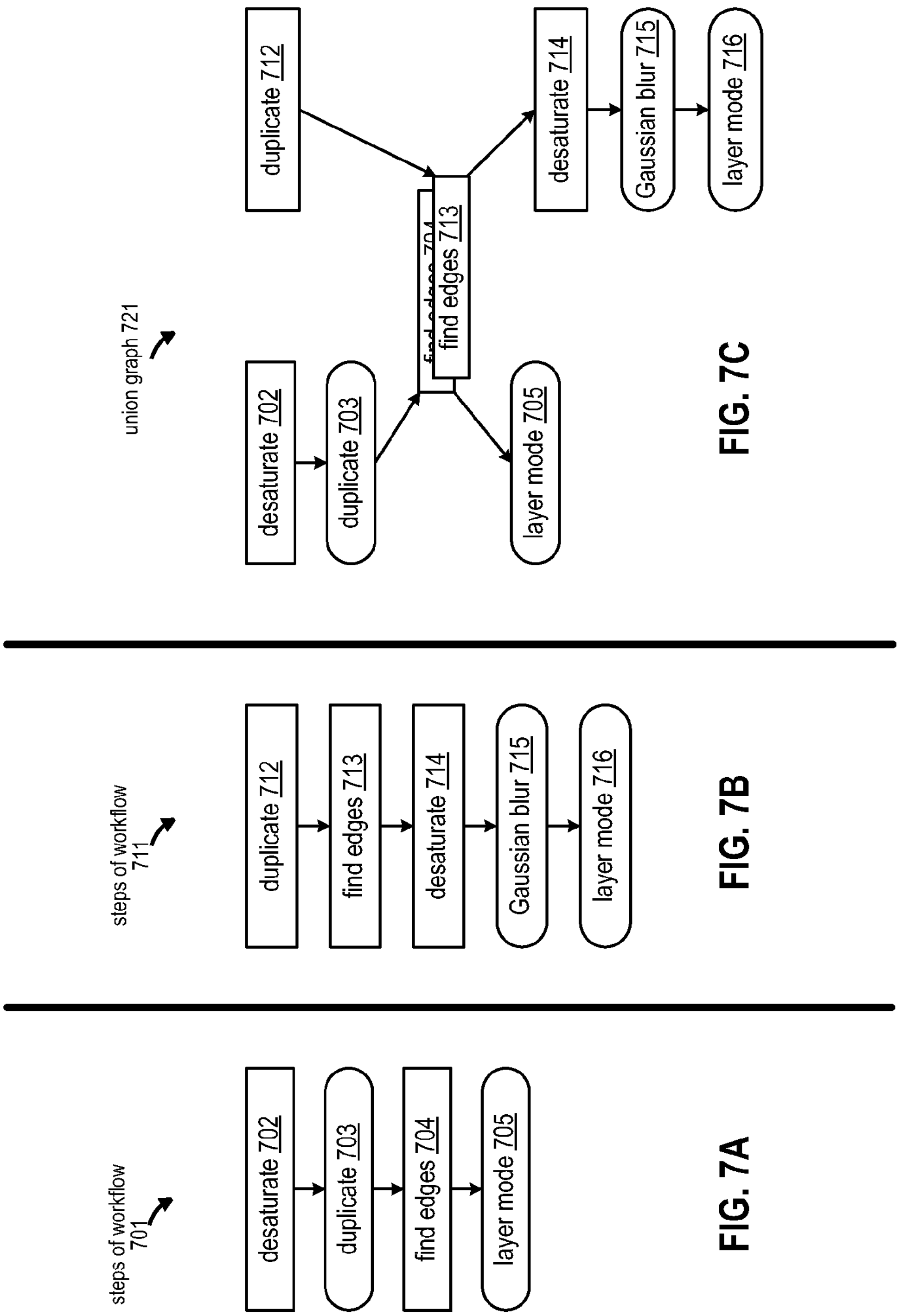
FIGS. 7A-7C conceptually illustrate how a union graph is generated, according to embodiments of the present invention.

FIGS. 7A-7C conceptually illustrate how a union graph 721 is generated, according to embodiments of the present invention. In one implementation, the workflow device 121 generates, or instructs the workflow device 100 to generate, the union graph 721 by using the edit distance computed for the cluster view, which is discussed above with reference to FIG. 5.

FIG. 7A is a diagram of steps of a workflow 701, according to one embodiment of the present invention. The steps of the workflow 701 include desaturate 702, duplicate 703, find edges 704, and layer mode 705.

FIG. 7B is a diagram of steps of a workflow 711, according to one embodiment of the present invention. The steps of workflow 711 include duplicate 712, find edges 713, desaturate 714, Gaussian blur 715, and layer mode 716.

FIG. 7C is a diagram of a union graph 721 the combines workflow 701 with workflow 711, according to one embodiment of the present invention. The union graph 721 includes steps of both workflow 701 and workflow 711. The workflow engine 121 considers that steps in both workflows that have the same name and parameters are shared steps. Such shared steps are workflows and are visually centered in the union graph 721. In this example, "find edges" is the only shared step (e.g., find edges 704 and find edges 714). The workflow engine 121 sends to the display device commands without parameters as rectangles and displays commands with parameters as rounded rectangles. Node tooltips (not shown) provide the full name of the step and any parameters for that step. The union graph 721 enables the user to judge similarity by identifying shared steps and presenting the shared steps to the user in an easy-to-read detailed view format.

Overview of Methods

FIGS. 8-11 are flowcharts of method steps for sending pre-defined workflows to a user device, according to embodiments of the present invention. Although the method steps are described herein in conjunction with the workflow engine 121 of FIGS. 1-7, one skilled in the art will understand that any system configured to implement the method steps, in any order, falls within the scope of the present invention.

Figure 8:
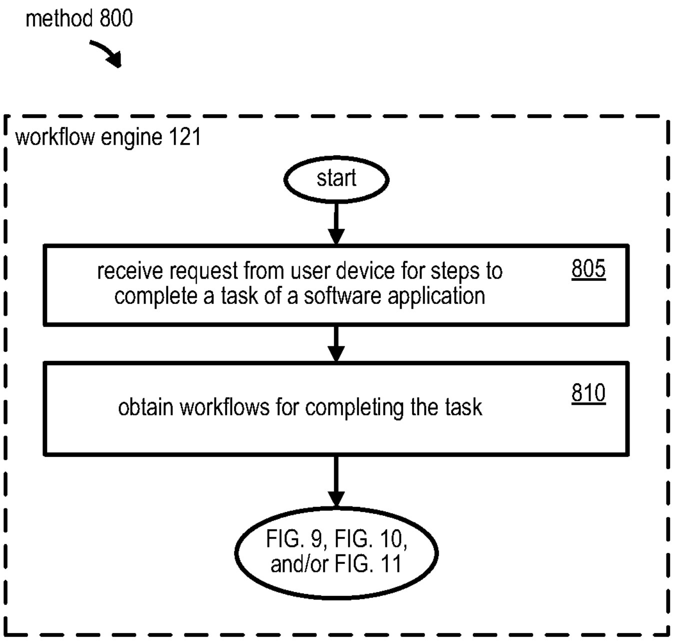
FIG. 8 is a flowchart of method steps for sending pre-defined workflows to a user device, according to one embodiment of the present invention.

FIG. 8 is a flowchart of overall method steps for sending pre-defined workflows to a display device of a user device, according to one embodiment of the present invention. As shown, a method 800 begins in a step 805 where the workflow engine 121 receives a request from the user device for steps to complete a task of a software application. The workflow engine 121 may be located on a network (as shown in FIG. 2B) or on the user device (as shown in FIGS. 2C and 2D). At a step 810, the workflow engine 121 obtains workflows for completing the task of the software application. For example, the workflow engine 121 can search, or instruct the workflow device 100 to search, a database on a network (e.g. the Internet) or on the user device for workflows. Each workflow includes steps (including one or more commands) the user device can execute to complete the task. Then, the method 800 proceeds to method steps of FIG. 9, FIG. 10, and/or FIG. 11.

Figure 9:
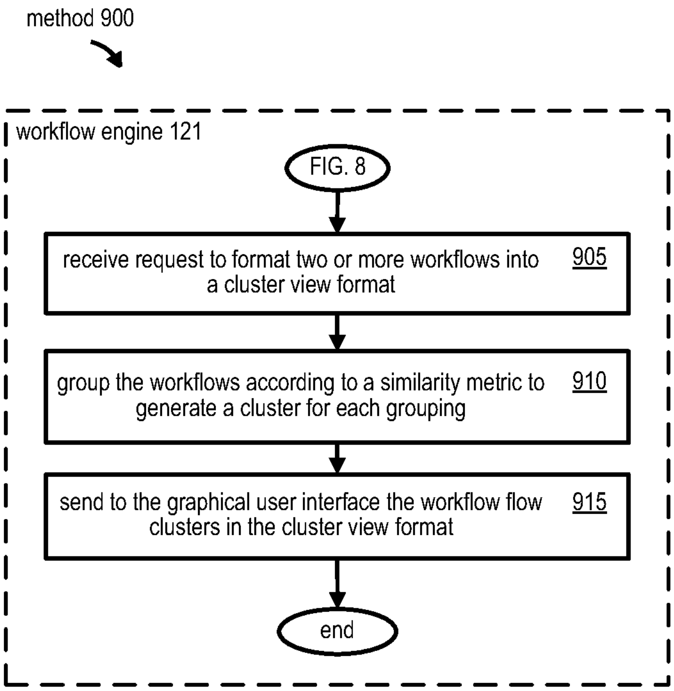
FIG. 9 is a flowchart of method steps for sending pre-defined workflows in a cluster view format, according to one embodiment of the present invention.

FIG. 9 is a flowchart of method steps for sending predefined workflows in a cluster view format, according to one embodiment of the present invention. As shown, a method 900 begins in a step 905 where the workflow engine 121 receives a request to format two or more workflows into a cluster view format. In a step 910, the workflow engine 121 groups the workflows according to a similarity metric to generate a cluster for each grouping. In a step 915, the workflow engine 121 sends to the display device the workflow clusters in the cluster view format.

Figure 10:
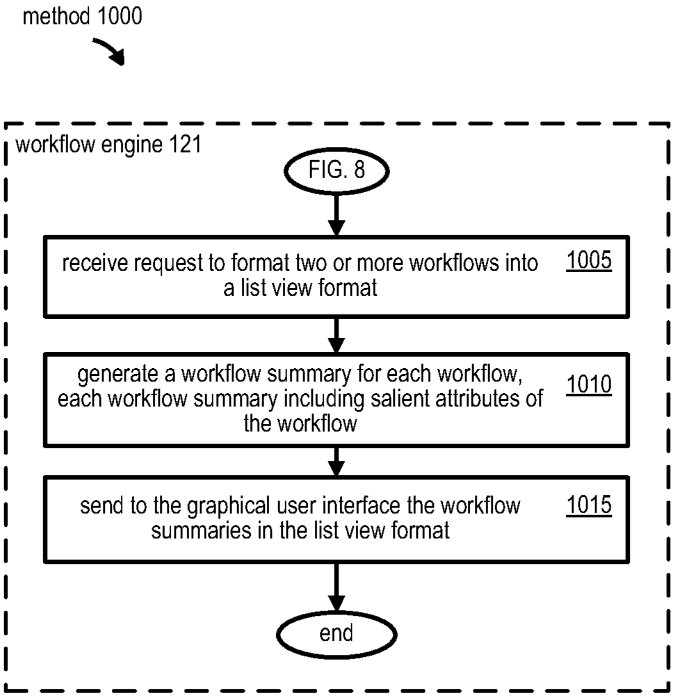
FIG. 10 is a flowchart of method steps for sending pre-defined workflows in a list view format, according to one embodiment of the present invention.

FIG. 10 is a flowchart of method steps for sending pre-defined workflows in a list view format, according to one embodiment of the present invention. As shown, a method 1000 begins in a step 1005 where the workflow engine 121 receives a request to format two or more workflows into a list view format. In a step 1010, the workflow engine 121 generates a workflow summary for each workflow. Each summary of a workflow includes one or more salient attributes of the workflow. In a step 1015, the workflow engine 121 sends to the display device the workflow summaries in the list view format.

Figure 11:
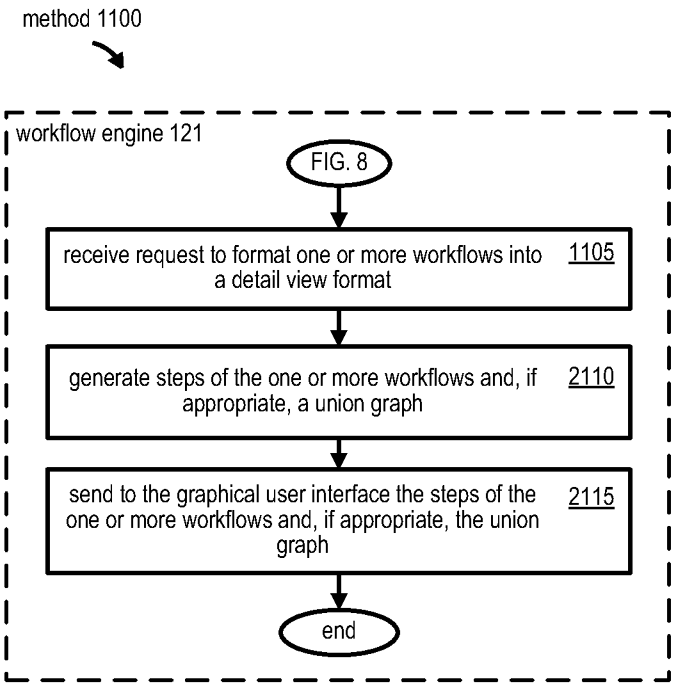
FIG. 11 is a flowchart of method steps for sending pre-defined workflows in a detail view format, according to one embodiment of the present invention.

FIG. 11 is a flowchart of method steps for sending pre-defined workflows in a detail view format, according to one embodiment of the present invention. As shown, a method 1100 begins in a step 1105 where the workflow engine 121 receives a request to format one or more workflows into a detail view format. In a step 2110, the workflow engine 121 generates steps of the one of more workflows and, if appropriate, generates a union graph. For example, the workflow engine 121 can receive selection of two or more workflows in the list view and, in response, format the details of the workflows for the detail view. The details may include steps of the workflows and a union graph for comparing steps of two workflows, including shared steps. In an action 2115, the workflow engine 121 sends to the display device the steps of the one or more workflows and, if appropriate, provides the union graph.

The methods of FIGS. 8-11 may include other steps and/or details that are not discussed in this method overview. Other steps and/or details described herein may be a part of the methods, depending on the implementation. Persons skilled in the art will understand that any system configured to implement the method steps, in any order, falls within the scope of the present invention.

Advantageously, the present approach enables a user to read a summary of each workflow and, based on the summaries, enables the user to perform a comparison among workflows that is quicker than a comparison based on reading source documents (e.g., help guides, instruction manuals, online tutorials, Internet forums, Internet chat rooms, etc.).

While the foregoing is directed to embodiments of the present invention, other and further embodiments of the present invention may be devised without departing from the basic scope thereof. For example, aspects of the present invention may be implemented in hardware or a combination of hardware and software. One embodiment of the present invention may be implemented as a program product for use with a computer system. The program(s) of the program product define functions of the embodiments (including the methods described herein) and can be contained on a variety of computer-readable storage media (e.g., non-transitory, tangible, computer-readable storage media). Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for sending pre-defined workflows to a display device of a user device, the method comprising:

receiving a request for steps to complete a task associated with a software application;

in response to receiving the request for steps, obtaining at least a first workflow including a first plurality of steps that the user device can execute to complete the task, and a second workflow including a second plurality of steps that the user device can execute to complete the task;

generating a summary of the first workflow and a summary of the second workflow, wherein the summary of the first workflow includes one or more attributes of the first workflow, and the summary of the second workflow includes one or more attributes of the second workflow;

determining a first set of operations that each corresponds to one or more of an insertion, a deletion, or a substitution of a corresponding step in the first plurality of steps included in the first workflow to transform the first workflow into the second workflow;

assigning a cost to each operation in the first set of operations based on where the corresponding step is displayed relative to another step in the first plurality of steps, wherein a first operation is assigned a first cost when a first step and a second step are displayed within a first distance of each other and is assigned a second cost when the first step and the second step are displayed at larger than the first distance from each other, wherein the first cost is lower than the second cost; and summing the costs associated with each operation in the first set of operations to compute a substitution cost for transforming the first workflow into the second workflow; and displaying on the display device at least the first workflow, the second workflow, and the substitution cost in one or more view formats.

2. The method of claim 1, further comprising:

before generating the summary, receiving a request to format the first workflow and the second workflow into a list view format; and pre-defining the attributes as salient attributes according a controlled study performed on a group of users.

3. The method of claim 2, wherein the controlled study comprises information obtained from performing at least one of:

showing a group of users a set of workflows that include steps for accomplishing the task;

receiving a selection from each user of a workflow that each user would most likely use to complete the task; and calculating the salient attributes for the first workflow and the second workflow by analyzing selections of the users.

4. The method of claim 2, further comprising:

pre-defining the attributes of the first workflow and the second workflow by receiving manual selections of salient attributes.

5. The method of claim 2, wherein the salient attributes of the first workflow include at least one of:

an image representing a state of operations of the software application before performing the task;

an image representing a state of operations of the software application after performing the task;

a title of the first workflow;

a number of steps of the first workflow; and a list of steps of the first workflow.

6. The method of claim 1, further comprising:

receiving a request to format the first workflow and the second workflow into a cluster view format;

grouping the first workflow and the second workflow according to a similarity metric to generate a cluster including the first workflow and the second workflow; and sending the cluster to the display device.

7. The method of claim 6, wherein the similarity metric includes at least one of:

a substantially same number of steps for the first workflow and the second workflow;

a substantial number of steps in common among the first workflow and the second workflow; and a same author of the first workflow and the second workflow.

8. The method of claim 1, further comprising:

receiving a request to format the first workflow and the second workflow into a detail view format;

generating detailed steps of the first workflow and detailed steps of the second workflow, wherein each detailed step includes a step that the user device can execute to move towards completion of the task;

generating a union graph that includes a pair-wise comparison of the steps of the first workflow and steps of the second workflow; and sending to the display device the steps of the first workflow, the steps of the second workflow, and the union graph.

9. The method of claim 8, wherein generating the union graph is performed in response to receiving a selection of both the first work flow and the second workflow in the list view format.

10. A non-transitory computer-readable storage medium storing instructions that, when executed by a processor, cause the processor executing a program to provide pre-defined workflows to a display device of a user device by performing steps of:

receiving a request for steps to complete a task associated with a software application;

in response to receiving the request for steps, obtaining at least a first workflow including a first plurality of steps that the user device can execute to complete the task, and a second workflow including a second plurality of steps that the user device can execute to complete the task;

generating a summary of the first workflow and a summary of the second workflow, wherein the summary of the first workflow includes one or more attributes of the first workflow, and wherein the summary of the second workflow includes one or more attributes of the second workflow;

determining a first set of operations that each corresponds to one or more of an insertion, a deletion, or a substitution of a corresponding step in the plurality of steps included in the first workflow to transform the first workflow into the second workflow;

assigning a cost to each operation in the first set of operations based on where the corresponding step is displayed relative to another step in the first plurality of steps, wherein a first operation is assigned a first cost when a first step and a second step are displayed within a first distance of each other and is assigned a second cost when the first step and the second step are displayed at larger than the first distance from each other, wherein the first cost is lower than the second cost; and summing the costs associated with each operation in the first set of operations to compute a substitution cost for transforming the first workflow into the second workflow; and displaying on the display device at least the first workflow, the second workflow, and the substitution cost in one or more view formats.

11. The non-transitory computer-readable storage medium of claim 10, further comprising steps of:

before generating the summary, receiving a request to format the first workflow and the second workflow into a list view format; and pre-defining the attributes as salient attributes according a controlled study performed on a group of users.

12. The non-transitory computer-readable storage medium of claim 11, wherein the controlled study comprises information obtained from performing at least one of:

showing a group of users a set of workflows that include steps for accomplishing the task;

receiving a selection from each user of a workflow that each user would most likely use to complete the task; and calculating the salient attributes for the first workflow and the second workflow by analyzing selections of the users.

13. The non-transitory computer-readable storage medium of claim 11, further comprising steps of:

pre-defining the attributes of the first workflow and the second workflow by receiving manual selections of salient attributes.

14. The non-transitory computer-readable storage medium of claim 11, wherein the salient attributes of the first workflow include at least one of:

an image representing a state of operations of the software application before performing the task;

an image representing a state of operations of the software application after performing the task;

a title of the first workflow;

a number of steps of the first workflow; and a list of steps of the first workflow.

15. The non-transitory computer-readable storage medium of claim 10, further comprising steps of:

receiving a request to format the first workflow and the second workflow into a cluster view format;

grouping the first workflow and the second workflow according to a similarity metric to generate a cluster including the first workflow and the second workflow; and sending to the display device the cluster.

16. The non-transitory computer-readable storage medium of claim 15, wherein the similarity metric includes at least one of:

a substantially same number of steps for the first workflow and the second workflow;

a substantial number of steps in common among the first workflow and the second workflow; and a same author of the first workflow and the second workflow.

17. The non-transitory computer-readable storage medium of claim 10, further comprising steps of:

receiving a request to format the first workflow and the second workflow into a detail view format;

generating detailed steps of the first workflow and detailed steps of the second workflow, wherein each detailed step includes a step that the user device can execute to move towards completion of the task;

generating a union graph that includes a pair-wise comparison of the steps of the first workflow and steps of the second workflow; and sending to the display device the steps of the first workflow, the steps of the second workflow, and the union graph.

18. The non-transitory computer-readable storage medium of claim 17, wherein generating the union graph is performed in response to a step of receiving a selection of both the first work flow and the second workflow in the list view format.

19. A workflow device for sending pre-defined workflows to a display device of a user device, the workflow device comprising:

a memory storing a workflow engine; and a processor coupled to the memory, wherein, when executed by the processor, the workflow engine configures the processor to:

receive a request for steps to complete a task associated with a software application;

in response to receiving the request for steps, obtain at least a first workflow including a first plurality of steps that the user device can execute to complete the task, and a second workflow including a second plurality of steps that the user device can execute to complete the task;

generate a summary of the first workflow and a summary of the second workflow, wherein the summary of the first workflow includes one or more attributes of the first workflow, and wherein the summary of the second workflow includes one or more attributes of the second workflow;

determining a first set of operations that each corresponds to one or more of an insertion, a deletion, or a substitution of a corresponding step in the plurality of steps included in the first workflow to transform the first workflow into the second workflow;

assigning a cost to each operation in the first set of operations based on where the corresponding step is displayed relative to another step in the first plurality of steps, wherein a first operation is assigned a first cost when a first step and a second step are displayed within a first distance of each other and is assigned a second cost when the first step and the second step are displayed at larger than the first distance from each other, wherein the first cost is lower than the second cost; and summing the costs associated with each operation in the first set of operations to compute a substitution cost for transforming the first workflow into the second workflow; and displaying on the display device at least the first workflow, the second workflow, and the substitution cost in one or more view formats.

20. The workflow device of claim 19, wherein the workflow engine is further configured to:

receive a request to format the first workflow and the second workflow into a list view format; and pre-define the attributes as salient attributes according a controlled study performed on a group of users.

21. The non-transitory computer-readable storage medium of claim 10, wherein the first plurality of steps includes at least one step that is included in the second plurality of steps, and the first plurality of steps includes at least one step that is not included in the second plurality of steps.

22. The non-transitory computer-readable storage medium of claim 21, wherein the first plurality of steps comprises a first plurality of design tool commands, and the second plurality of steps comprises a second plurality of design tool commands.

23. The method of claim 1, wherein the first plurality of steps and the second plurality of steps are displayed simultaneously in at least one of the one or more view formats.

* * * * *